March 25, 1958  J. U. WHITE  2,827,825
RAMAN TUBE APPARATUS
Filed March 22, 1955
FIG. 1
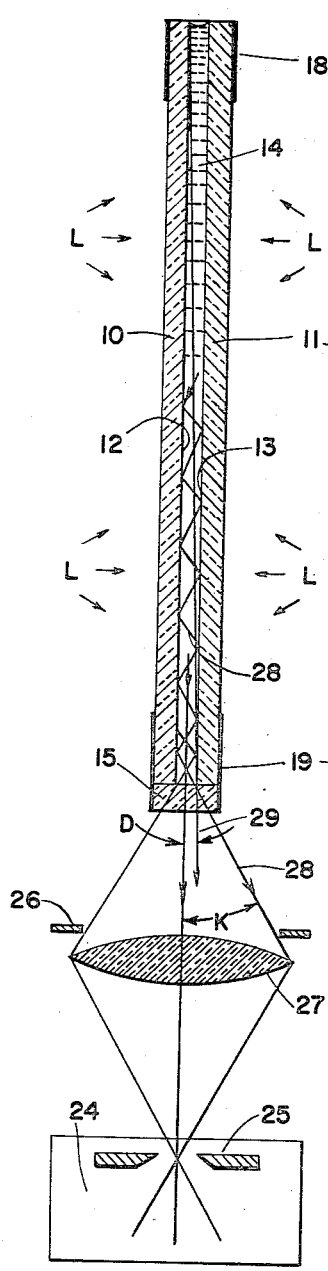
FIG. 2
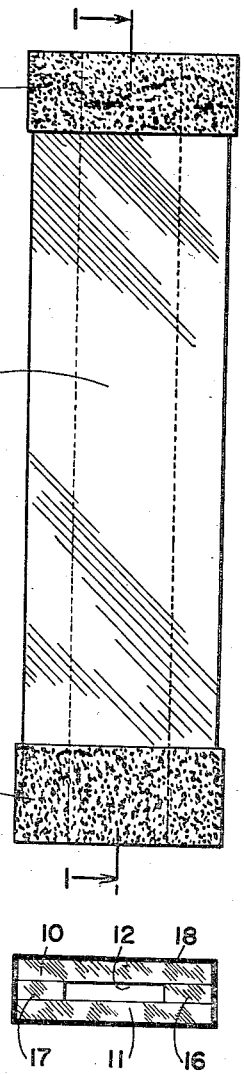
FIG. 3
FIG. 4
FIG. 5
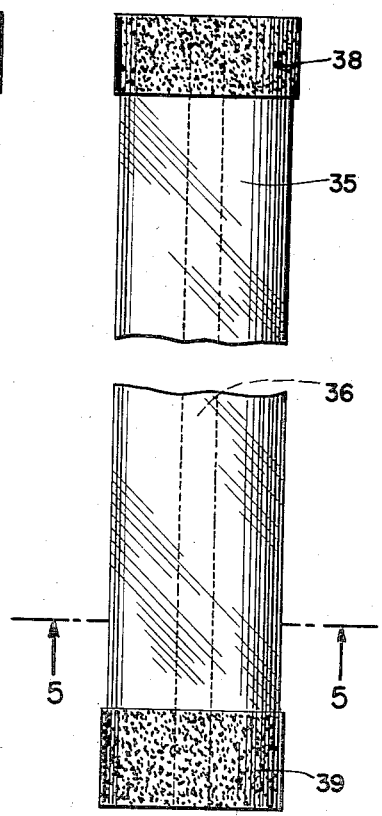
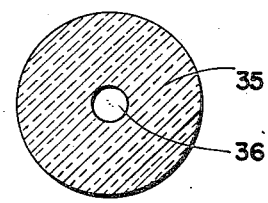

United States Patent Office 2,827,825
Patented Mar. 25, 1958

2,827,825

RAMAN TUBE APPARATUS

John U. White, Darien, Conn., assignor to The White Development Corporation, Stamford, Conn., a corporation of Connecticut Application March 22, 1955, Serial No. 495,957

2 Claims. (Cl. 88—14)

This invention relates to apparatus and a method of the type in which radiant energy, such as visible or invisible light, is passed through a sample whose scattering characteristics are to be determined, and the emerging radiation is observed, measured or recorded. More particularly, the present invention is applicable to Raman tubes and associated apparatus and methods.

In one form of Raman tube used heretofore there was employed a cylindrical tube, filled with a liquid sample to be measured, light was directed into the tube transversely through the sides, and scattered light emerged from the end of the tube and was then observed, measured or recorded with the aid of apparatus, such as a monochromator, capable of distinguishing the different wave length components of light and including light-sensing means. In the region where the light emerged, masking means including an aperture was employed, designated to be of such size and shape that the only light allowed to pass through the aperture was that which has been scattered in the sample inside the tube and had passed longitudinally along the sample without striking the sides of the tube. The light passing through the aperture passed through a viewing lens and was then observed, measured, or recorded. In that type of Raman tube arrangement, the light-sensing means would not "see" any portion of the inside walls of the Raman tube.

A limiting factor in the operation of such apparatus is the amount of light obtained from the Raman tube and entering the viewing lens, with a given amount of sample and a given amount of illumination of the tube.

An object of the present invention is to provide a Raman tube which gives more such effective light entering the viewing lens, for a given amount of sample and a given amount of illumination of the tube.

One feature of the present invention is that light is caused to be totally internally reflected within the sample from the inner surface of the walls of the tube, and to progress in a zigzag path along the tube to the exit end of the tube, where the emerging light, including some of that totally internally reflected within the sample, is measured.

In one embodiment of the invention there are provided two parallel, transparent side plates or wall plates between which is held a liquid sample whose properties are to be determined. The refractive index of the side plates is less than the refractive index of the sample. The tube is illuminated through the transparent portions of the side plates, and a small portion of the entering light is scattered in the sample. The part of the scattered light traveling in a direction close to the axis of the tube is trapped within the sample, so that it progresses in a zigzag path within the sample along the tube, being totally internally reflected at the inner surfaces of the side plates, and by this path the light reaches the end of the tube and emerges in the shape of a wedge, which may also be referred to as a rectangular cone. The emerging light enters optical apparatus, such as a monochromator, used to observe, measure or record the results. This apparatus includes light-responsive means and aperture-forming means for same, arranged so that the light-responsive means "sees" a major portion of the inner surfaces of the side plates. Thus emerging light which has struck the sides of the tube is not masked off, but is used, the effective aperture of the monochromator being great enough to permit passage and use of the emerging light which has, during its progress through the tube, struck the sides. The emerging light fills the aperture of the monochromator. In use of this new type of Raman tube, the inner surfaces of the side plates should be kept very clean.

These and other features and objects obtainable by the practice of the present invention will be understood by persons skilled in the art by reference to the following detailed description taken in connection with the annexed drawings, which describe and illustrate a preferred embodiment of the invention.

Figure 1 is a longitudinal sectional view of a Raman tube illustrating the present invention, together with a schematic representation of associated optical apparatus such as a monochromator.

Figure 2 is a side elevational view of the Raman tube shown in Figure 1. The position of the sectional plane for Figure 1 is shown at 1—1 in Figure 2.

Figure 3 is a plan view of the Raman tube of Figures 1 and 2, as seen from above.

Figure 4 is a side elevational view of a Raman tube having a round bore.

Figure 5 is a sectional view of the Raman tube of Figure 4.

The Raman tube shown in Figures 1, 2 and 3 which illustrates one form of the invention, comprises a pair of plates 10 and 11, having opposed parallel spaced-apart inner faces 12 and 13. The space between the face 12 and the face 13 may for example be of the order of 0.006 inch. The plates 10 and 11 are of transparent material and have a refractive index lower than that of the sample to be studied. The term "transparent" as used herein will be understood to means pervious to radiation of the type being employed, for example, visible or invisible light. In one illustrative arrangement, the plates 10 and 11 may be made of fused quartz, which has a refractive index of $n_D 1.458$. Other materials may, however, be employed. As will be understood from the description herein, highly desirable results are obtainable, in practicing the present invention, from using for the walls of the Raman tube materials having a refractive index lower than that of the sample, but for this purpose, not only fused quartz, but materials having still lower refractive indexes may advantageously be used, such as fluorite (calcium fluoride), lithium fluoride, or magnesium fluoride. Fabrication and cleaning of the tube is somewhat more difficult with these last three materials than with fused quartz.

The sample, indicated herein as a liquid 14, is held between the plates 10 and 11. At the bottom of the plates 10 and 11 is a window plate 15, which is also of transparent material.

For keeping the plates 10 and 11 in the proper spaced-apart parallel relation, there are provided spacers 16 and 17, which are preferably transparent. These spacers and the window plate 15 may advantageously be, but need not necessarily be, of the same material as the side plates. The window plate 15, the spacers 16 and 17, and the side plates 10 and 11 are cemented together in the relationship shown. The resulting container holds the liquid sample and also has special optical properties, to be described.

Extending around the sides of the tube at each end thereof, are masking means 18 and 19, such as a layer of black paint.

Enough of the sample is placed in the tube to bring the meniscus of the top of the liquid up to the region within the masking means 18.

The tube is illuminated with light from its sides. The directions from which this light comes are generally indicated in the drawing by the reference character "L" and associated arrows. If the spacers 16 and 17 are transparent, the tube may be effectively illuminated not only through the main faces of the side plates, but from all four of its sides. Stated differently, the tube may be illuminated through a full 360 degrees (measured in a plane perpendicular to its axis). The light thus enters the tube in a direction generally transverse to, but not necessarily exactly perpendicular to, the longitudinal axis of the tube. The entering light need not be collimated; some of it may be perpendicular to the axis of the tube and some may have partly longitudinal components.

As an illustration, a mercury arc lamp shaped in the form of a spiral may be used. The tube is not illuminated by rays entering axially at the top. Such rays would appear much brighter when they emerge at the bottom than does the desired scattered light.

There is provided a monochromator 24 having jaws 25 defining an entrance slit. There is also provided a mask 26 and a lens 27. The mask limits the angular aperture used in the monochromator.

When a photon is scattered in the liquid in a direction close to the axis of the tube, it is trapped in the liquid. This is true because whenever it strikes a wall, such as 12 or 13, it is totally internally reflected provided the angle of incidence between the incident ray and the normal to the surface is greater than the critical angle "C," where C is the angle whose sine equals $$\frac{n_w}{n_s}$$

In this expression, $n_w$ is the index of refraction of the side plate defining the wall surface 12 or 13, and $n_s$ is the index of refraction of the sample.

When the light is thus totally internally reflected, it thereafter crosses from one wall to the other and progresses in a zigzag path, such as that indicated by the line 28, so that it progresses along the tube until it emerges through the window plate 15, as shown.

The light emerging from the bottom of the tube is in the shape of a wedge or rectangular cone of light, which fills the aperture of the monochromator. The angle of the wedge of light emerging is equal to 2K, where, as shown on the drawing, K is the angle between the outside of the wedge and the axis.

The angle K is approximately equal to $$n_s \left[ 90° - \sin^{-1}\left(\frac{n_w}{n_s}\right) \right]$$

which equals approximately $$n_s \left[ 1 - \left(\frac{n_w}{n_s}\right)^2 \right]$$

The factor $n_s$ takes account of the refraction when the light leaves the sample and emerges through the window.

If, for example, quartz having an index of refraction of $n_D 1.458$ is used for the side plates, and benzene having an index of refraction of $n_D 1.501$ is used for the sample, $K = 4.8$ degrees. The total angle between the sides of the wedge $2K = 9.6$ degrees.

The aperture of the monochromator is adjusted, by the position of the mask 26, so that the wedge of emerging light, having a total angle of 2K, fills the aperture. That is, the size of the aperture is approximately equal to, or slightly less than, enough to accept this wedge of emerging light which has a total angle 2K.

In prior Raman tubes no effort was made to produce and take advantage of totally internally reflected light rays; on the contrary, masking means were employed so positioned that the useful light was primarily the scattered light which passed along a path through the sample without striking the sides of the tube. A ray which just misses striking a side of the tube is shown in Fig. 1 as 29. The angle D between this particular ray and the axis is the greatest angle such a ray may have without striking a side of the tube. The angle D may be expressed as $$n_s \sin^{-1}\left(\frac{T}{A}\right)$$

where T is the distance between the wall plates, which is determined by the thickness of the spacers, A is the length of the tube, and $n_s$ is the index of refraction of the sample. Since the angle D is small, it is approximately equal to $$n_s \frac{T}{A}$$

In the present invention, the half-angle K of the wedge of useful light derived from the Raman tube is greater than D, defined above. More particularly, the angular extent of the wedge of useful light emerging from the Raman tube and entering the light-responsive means is greater than and preferably at least several times as great as the angle which would just exclude rays from the sides of the tube. Thus K may satisfactorily be three times as great as D. Even greater advantages are realized when K is many times as great as D.

Of the light striking the light-responsive means of the monochromator the major portion (more than half) is light reflected from the interior surfaces of the sides of the tube.

All inner wall surfaces of the tube, such as 12 and 13, should be thoroughly cleaned before the sample is introduced, to remove dirt. The principles of operation of the tube are such that irregularities within the wall plates themselves and dirt on the outside surfaces of the tube have little or no effect on the operation, but dirt on the inner walls of the tube protrudes into the sample and causes a large contribution to the total scattered light. To avoid concealing of the desired light by the effects of such dirt, the inner walls should therefore be kept extremely clean.

A wide variety of dimensions may be used for the tube. A tube constructed as described above has been found to be satisfactory, using the following illustrative dimensions:

|  | Length, inches | Width, inches | Thickness, inches |
|---|---|---|---|
| Side Plates | 4 | ½ | ⅛ |
| Spacers |  | ¼ | 0.006 |
| Window Plate |  |  | ⅛ |

Cross section of interior of tube, ½ inch by 0.006 inch
Total volume of tube, 0.14 milliliter
Illuminated path (space between adjacent edges of masks on side plates), 9.0 centimeters In one such arrangement the emerging light filled 8 millimeters of the entrance slit.

It will be understood of course that these are merely illustrative dimensions, and a variety of other dimensions may be satisfactorily used.

The illustrative form of the invention, in which the tube comprises a pair of flat, closely-spaced side plates is, for most purposes, the preferred form of the invention, for the reason that the cross section of the tube is slit-like in shape, and thus has the same shape as the entrance slit of monochromators and similar apparatus. Certain of the broader features of the invention, however, may be applied to arrangements having different shapes. For example, the tube 35 may have a round bore 36, and may have an outer surface which is round, as shown in Figs. 4 and 5. Or the bore or sample space may be round but the outer surface may be square or rectangular. Such round-bore tubes may advantageously be the same in longitudinal section and has been described in connection with Fig. 1. The tube is illuminated from the sides, preferably through 360 degrees (measured in a plane perpendicular to the axis of the tube). The material comprising the walls of the tube has a smaller index of refraction than that of the sample. A certain portion of the scattered light is trapped within the tube and progresses, by total internal reflections, along a zigzag path toward the exit end of the tube, as has been described. The emerging light is in the shape of a true or circular cone.

The same materials identified previously as suitable for the walls of the tube of Figs. 1–3 may be used in the tube of Figs. 4 and 5. There are definite advantages in using a tube having side walls consisting essentially of a material selected from the class consisting of fused quartz, calcium fluoride, lithium fluoride, and magnesium fluoride. The index of refraction of each of these materials is no higher than 1.458.

The round-bore tube of Figs. 4 and 5 is adapted to be used in connection with light-responsive means in the manner which has been described in connection with Fig. 1. The angular extent of the cone of useful light from the round-bore arrangement entering the light responsive means is, as in the case of the flat-plate arrangement, greater than and preferably at least several times as great as the angle which would just exclude rays from the sides of the tube. The light-sensing element "sees" a major portion of the inner surfaces of the sides of the tube. Of the light reaching the light-sensing element, the major portion is light which has been reflected from the sides of the tube.

As has been explained, however, the flat-plate arrangement first described has certain advantages over the round-bore arrangement. The wedge of emerging light in the flat-plate arrangement is elongated in cross section, and for illuminating the slit of a monochromator, this is preferable to the true cone of light from the round-bore arrangement, this cone of light being circular in cross section.

While a suitable form of apparatus and method to be used in accordance with the invention has been described in some detail, and certain modifications have been suggested, it will be understood that numerous changes may be made without departing from the general principles and scope of the invention.

I claim:

1. Apparatus for use in Raman spectroscopy comprising a pair of opposed plates of transparent material, having opposed, spaced-apart parallel faces, for containing between said faces a liquid whose properties are to be determined, the index of refraction of said plates being lower than that of said liquid, means for illuminating said liquid transversely with light entering from the side through at least one of said plates, whereby light is trapped within said liquid and is caused to progress by total internal reflection along a zigzag path through said tube toward one end thereof, where it emerges in the shape of a wedge of light filling an angular aperture of at least approximately $$2n_s\left[90° - \sin^{-1}\left(\frac{n_w}{n_s}\right)\right]$$

where $n_w$=index of refraction of said plates, and $n_s$=index of refraction of said liquid.

2. Apparatus for use in Raman spectroscopy comprising a pair of opposed plates of transparent material, having opposed, spaced-apart parallel faces, for containing between said faces a liquid whose properties are to be determined, the index of refraction of said plates being lower than that of said liquid, means for illuminating said liquid transversely with light entering from the side through at least one of said plates, whereby light is trapped within said liquid and is caused to progress by total internal reflection along a zigzag path through said tube toward one end thereof, where it emerges in the form of a wedge and may be measured, and means responsive to said emerging light, through an angle including at least some of said light which has been totally internally reflected from the interior surfaces of said plates, said angle being no greater than $$2n_s\left[90° - \sin^{-1}\left(\frac{n_w}{n_s}\right)\right]$$

where $n_w$=index of refraction of said plates, and $n_s$= index of refraction of said liquid.

References Cited in the file of this patent
UNITED STATES PATENTS

| | | |
|---|---|---|
| 1,648,369 | Svedberg et al. | Nov. 8, 1927 |
| 2,282,741 | Parker | May 12, 1942 |
| 2,436,262 | Miller | Feb. 17, 1948 |
| 2,490,345 | Flatford et al. | Dec. 6, 1949 |
| 2,527,121 | Dundenbostel | Oct. 24, 1950 |